Figure 1:
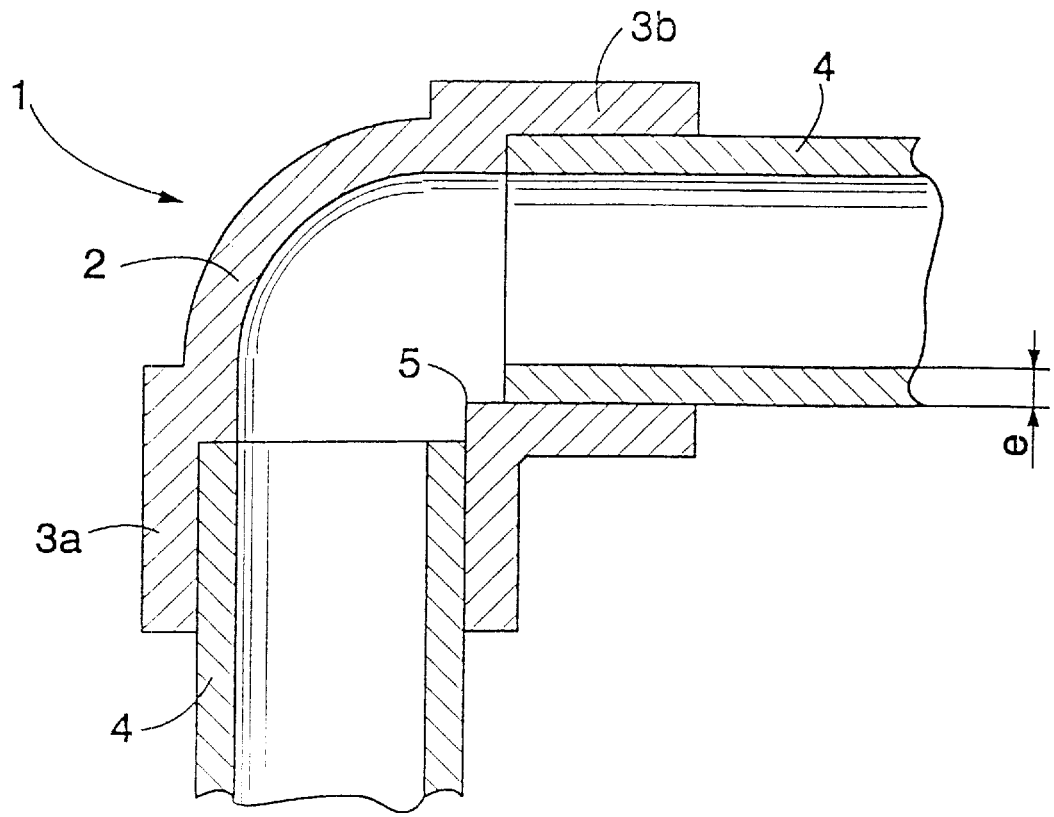

United States Patent
Smahl

[19]

[11] Patent Number: 6,086,116
[45] Date of Patent: Jul. 11, 2000

[54] PIPE JOINT FOR JOINING PIPES WITH A BENT PIPE OR BRANCH

[75] Inventor: Jarmo Smahl, Nastola, Finland

[73] Assignee: Uponor Innovation AB, Fristad, Sweden

[21] Appl. No.: 09/048,359

[22] Filed: Mar. 26, 1998

[30] Foreign Application Priority Data

Apr. 14, 1997 [FI] Finland ..................................... 971567

[51] Int. Cl.$^7$ ...................................................... F16L 43/00
[52] U.S. Cl. ...................................... 285/179; 285/148.27
[58] Field of Search .............................. 285/148.27, 179, 285/FOR 160

[56] References Cited

U.S. PATENT DOCUMENTS 5,449,204  9/1995  Greene et al. .

FOREIGN PATENT DOCUMENTS

| 0269792 | 6/1988 | European Pat. Off. . |
|---|---|---|
| 0557788 | 9/1993 | European Pat. Off. . |
| 0711948 | 5/1996 | European Pat. Off. . |
| 60432 | 9/1981 | Finland . |
| 3230354 | 2/1984 | Germany . |

*Primary Examiner*—Anthony Knight
*Assistant Examiner*—Karlena D. Schwing
*Attorney, Agent, or Firm*—Ladas & Parry

[57] ABSTRACT

The invention relates to a pipe joint for joining pipes with a bent pipe or branch (1) comprising a body (2) having an inner diameter less than the exterior diameter of the pipe (4) to be joined, and sleeve portions (3a, 3b) having an inner diameter substantially equal to the exterior diameter of the pipe (4) to be joined. Thus a step is formed between the body (2) and the sleeve portions (3a, 3b). The sleeve portion (3a, 3b) is eccentrically disposed relative to the body (2) in such a way that at the outer edge of the pipe joint the height of the step between the body (2) and the sleeve portion (3a, 3b) is substantially equal to the wall thickness (e) of the pipe (4) to be joined, and at the inner edge of the pipe joint the height of the step is less than 0.5 times the wall thickness (e) of the pipe (4) to be joined.

21 Claims, 2 Drawing Sheets

PIPE JOINT FOR JOINING PIPES WITH A BENT PIPE OR BRANCH

The invention relates to a pipe joint for joining pipes with a bent pipe or branch comprising a body and sleeve portions, wherein the inner diameter of the sleeve portions is substantially equal to the exterior diameter of the pipe to be joined and the inner diameter of the body is less than the exterior diameter of the pipe to be joined, so that a step is provided between the body and the sleeve portions.

European Patent Application 0 269 792 discloses fittings with a body and sleeve portions for joining pipes. The inner diameters of the sleeve portions correspond to the exterior diameter of the pipe. Small symmetrical steps are provided in the pipe fittings, on account of which the inner diameter of the body is less than the exterior diameter of the pipe. The steps, however, are so small that corners nearly equivalent to the thickness of the pipe wall are formed at the pipe ends, and vortices in the flow are produced in said corners. The effect of such vortices in increasing flow resistance is so great that even though the body has an inner diameter larger than the inner diameter of the pipe, the effective cross-section of the pipe fitting is clearly smaller than the effective cross-section of the pipe.

Finnish Patent 60 432 discloses various pipe joints. A central supporting collar is provided in the pipe-connecting fittings, the purpose of which is to facilitate the installation of pipes. The step formed by the central supporting collar is smaller than the inner diameter of the pipe, and thus there is a step at every point between the pipe end and the central supporting collar, which will produce a vortex increasing the flow resistance in the pipe joint. Furthermore, in the bent pipe disclosed in said patent the ends of the pipes to be joined produce a vortex at the inner corner of the bent pipe.

European Patent Application 0 557 788 discloses a connecting piece in which the sleeve portions are eccentrically disposed relative to the body, so that a reinforcement is produced in the inner corner of the pipe fitting. The reinforcement produces a considerable vortex in the pipe fitting, thus increasing the flow resistance. Furthermore, on account of the eccentricity a corner is formed at the outer edge of the fitting between the pipe end and the fitting, and a vortex is produced in said corner.

U.S. Pat. No. 5,449,204 discloses double containment fittings for a double containment pipe. The fittings disclosed in this patent correspond in their basic structure to those of European Patent Application 0 557 788 and therefore also have the corresponding drawbacks.

It is an object of the present invention to provide a pipe joint avoiding the drawbacks set out above.

The pipe joint in accordance with the invention is characterized in that the sleeve portions are eccentrically disposed relative to the body in such a way that at the outer edge of the joint the height of the step between the body and the sleeve portion is 0.75–1.25 times the wall thickness of the pipe to be joined, and in the inner corner of the joint the height of the step has a maximum of 0.75 times the height of the step at the outer edge, preferably less than 0.5 times the height of the step at the outer edge.

The pipe joint of the invention comprises a bent pipe or branch having a body and sleeve portions for joining a pipe. The body has an inner diameter less than the exterior diameter of the pipe to be joined, and the inner diameters of the sleeve portions correspond to the exterior diameter of the pipe. What is essential is that the sleeve portions are disposed eccentrically relative to the body in such a way that the step in the outer corner is essentially equal to the wall thickness of the pipe to be joined and there is essentially no step in the inner corner of the joint or the maximum height of the step is 0.75 times the height of the step at the outer edge, preferably less than 0.5 times the height of the step at the outer edge. The idea of a preferred embodiment is that the step between the body and the sleeve portion is so disposed that the distance between the end of the pipe to be joined and the inner corner of the joint in the axial direction of the pipe to be joined is 0.5–3 times the wall thickness of the pipe to be joined. The idea of another preferred embodiment is that a hole for the burr produced in the welding of the sleeve is provided in the pipe fitting, said hole tapering inwardly from the outer edge of the fitting.

It is an advantage of the invention that the flow resistance is relatively low in the pipe fitting, since there are substantially no vortex-producing elbows in the outer corner and there are two or more elbows in the inner corner, which will make the inner corner step-like and the vortices remain relatively small. Thus, the fitting has a large effective cross-section. Providing a hole for the welding burr, said hole tapering from the outer edge towards the inner edge, allows the welding burr to fill the hole at the outer edge, with the result that there are no vortex-producing corners at the outer edge, and at the inner edge the welding burr fills the inner angles between the corners, rounding off the inner corner and thereby reducing vortex creation. The fitting is simple in construction and therefore fast and inexpensive to manufacture.

Figure 2:
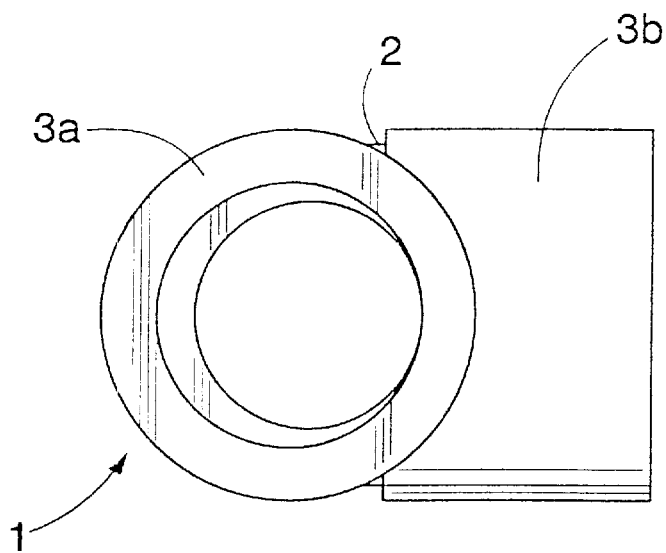
Figure 3:
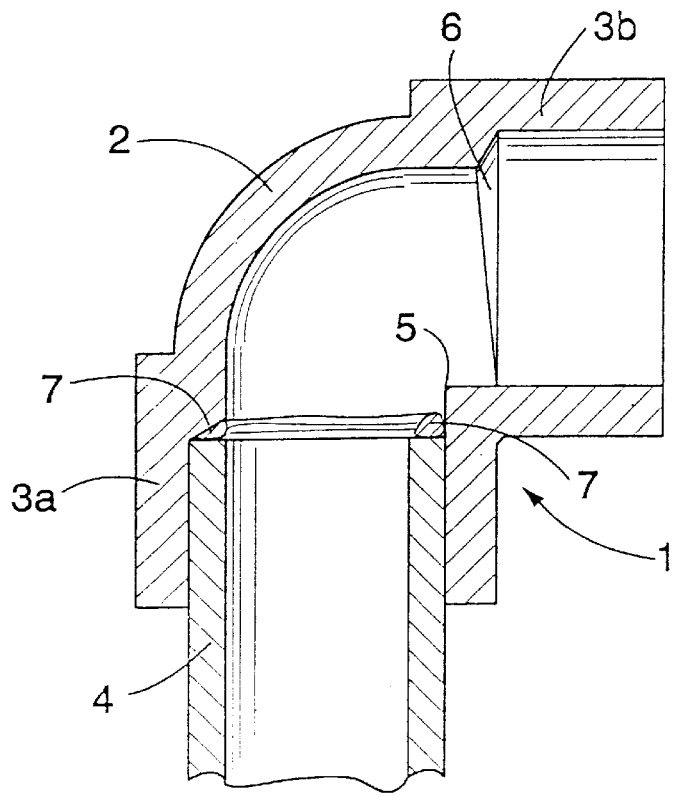
Figure 4:
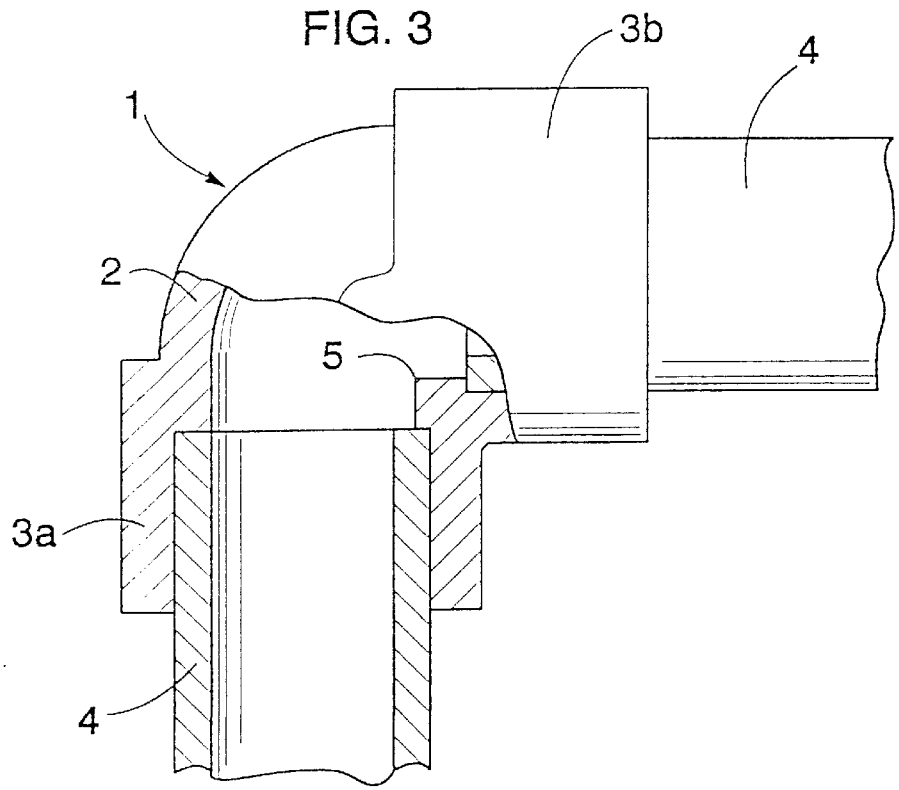

The invention will be explained in closer detail by means of the accompanying drawings, in which FIG. 1 is a cross-sectional side view of a pipe joint in accordance with the invention, FIG. 2 illustrates a bent pipe in accordance with FIG. 1 seen in the installation direction of the pipe, FIG. 3 is a cross-sectional side view of another pipe joint in accordance with the invention, and FIG. 4 is a partially cross-sectional side view of a third pipe joint in accordance with the invention.

FIG. 1 shows a bent pipe 1. The bent pipe 1 comprises a body 2 and sleeve portions 3a and 3b. The inner diameters of the sleeve portions 3a and 3b correspond to the exterior diameter of the pipes 4 to be joined. The pipes 4 can be joined to the bent pipe 1 for example by gluing or welding or by some other joining method known per se. The bent pipe 1 may be manufactured of plastic by injection moulding, for example. The inner diameter of the body 2 is less than the exterior diameter of the pipe 4, and thus a step is produced between the body 2 and the sleeve portions 3a and 3b, up to which point the pipe 4 is installed. The body 2 and the sleeve portions 3a and 3b are eccentrically disposed in such a way that the step is at its greatest at the outer edge of the joint and there is essentially no step at the inner corner of the joint. At the outer edge of the joint, the step preferably has a size substantially equal to the wall thickness e of the pipe 4 to be joined. The height of the step may be in the range 0.75–1.25 times the wall thickness e of the pipe to be joined. In such a case, the medium flowing within the pipes 4 and in the bend does not encounter too large a corner or elbow at the outer edge, as a result of which substantially no flow-hindering vortices are created. At the inner corner said pipe ends 4 form a step having the thickness e that the wall of the pipe 4 has at the pipe ends 4. This step naturally produces a small vortex, but the vortex does not cause as high a flow resistance as for instance if the inner corner had only one corner. Further, the location of the step between the body 2 and the sleeve portion 3a and 3b is preferably such that the distance of the end of the pipe 4 from the inner corner 5 of the bent pipe 1 in the axial direction of the pipe 4 is 0.5–3 times the wall thickness e of the pipe 4. Thus three step-like corners are formed at the inner edge of the pipe joint, which will produce only small vortices in the flow. Most preferably, the distance between the pipe end 4 and the inner corner 5 in the axial direction of the pipe is about 1–2 times the wall thickness of the pipe 4. Thus the flow resistance for the inner corner of the joint is nearly as small as if the inner corner were rounded, but the inner corner of the bent pipe 1 may be made angular, i.e., the tools required to produce the bent pipe 1 are simpler and less expensive.

FIG. 2 shows a bent pipe 1 in accordance with FIG. 1 seen in the direction of the pipe to be installed. The reference numerals in FIG. 2 correspond to those in FIG. 1. FIG. 2 clearly shows the relative eccentricity of the body 2 and the sleeve portions 3a and 3b.

FIG. 3 shows a cross-sectional side view of another pipe joint in accordance with the invention. The reference numerals in FIG. 3 correspond to those in FIGS. 1 and 2. The bent pipe 1 in accordance with FIG. 3 differs from that of FIG. 1 in that in this case, a hole (i.e., a cavity or space) 6 tapering from the outer edge of the bent pipe 1 towards the inner edge thereof is provided in the bent pipe 1. When, for example, a pipe 4 made of polyethylene or polypropylene is joined by the sleeve welding method to the bent pipe 1, a burr 7 is produced at the end of the pipe 4 to be joined. At the outer edge of the bent pipe 1, the hole 6 is so large that the burr 7 substantially fills the hole 6 at the outer edge, and hence there are essentially no vortex-producing irregularities at that spot. As the hole 6 tapers towards the inner edge of the bent pipe 1, some of burr 7 will also be located exterior of the hole 6. At the inner corner, this burr 7 fills the inner corner between the end of the pipe 4 and the inner wall of the bent pipe 1, rounding off the step-like inner corner of the joint, which will further reduce the vortex produced in the flow. For clarity, FIG. 3 does not show the pipe 4 to be joined in connection with the second sleeve portion 3b.

FIG. 4 shows a third bent pipe 1 in accordance with the invention. The reference numerals in FIG. 4 correspond to those in FIGS. 1–3. The bent pipe 1 in accordance with FIG. 4 differs from the bent pipe of FIG. 1 only in respect of the inner corner of the joint. The body 2 and the sleeve portions 3a and 3b are still eccentrically disposed, but at the inner corner of the joint the distance of the inner surface of the pipe 4 from the inner corner 5 in the radial direction of the pipe 4 is about half the wall thickness e of the pipe 4. At the inner corner of the joint, the maximum height of the step is 0.75 times the height of the step at the outer edge, preferably less than 0.5 times the height of the step at the outer edge. In such a case, three separate corners are still created in the inner corner of the joint, the flow-resistance increasing effect of the corners being less than that of one corner, for instance.

The drawings and the description relating to them are only intended to illustrate the idea of the invention. In its details, the invention may vary within the scope of the claims. Hence, the fitting employed in the pipe joint may be, except a bent pipe, a branch constructed in a corresponding manner. The size of the angle or bend may also be other than 90°, for example 45°. In a bent pipe, the cross-section of the inner diameter of the body may also deviate from a circle and be e.g. a circular arc on the outer side and an ellipse on the inner side.

I claim:

1. In a combination of a pipe (4) and bent pipe or branch (1) for joining the pipe (4) with the bent pipe or branch (1), the improvement of the bent pipe or branch (1) comprising a bent body (2) and sleeve portions (3a, 3b), wherein the inner diameter of the sleeve portions (3a, 3b) is substantially equal to the exterior diameter of the pipe (4) and the inner diameter of the body (2) is less than the exterior diameter of the pipe (4), so that a step is provided between the body (2) and the sleeve portions (3a, 3b), the sleeve portions (3a, 3b) are eccentrically disposed relative to the body (2), the sleeve portions (3a, 3b) are 0.75–1.25 times a wall thickness (e) of the pipe (4) and, in the inner corner (5) of the body (2), the maximum height of the step is 0.75 or less times the height of the step at the outer edge of the body (2), and the distance of the end of the pipe (4) from the inner corner of the body in the axial direction of the pipe (4) is less than three times the wall thickness (e) of the pipe (4).

2. The combination as claimed in claim 1, wherein the distance of the end of the pipe (4) from the inner corner (5) of the in the axial direction of the pipe (4) body (2) is 0.5–3 times the wall thickness (e) of the pipe (4).

3. The combination as claimed in claim 2, wherein the distance of the end of the pipe (4) from the inner corner (5) of the in the axial direction of the pipe (4) body (2) is 1–2 times the wall thickness (e) of the pipe (4).

4. The combination as claimed in claim 1, wherein a space (6) is provided in the bent pipe or branch (1), so that when the pipe (4) is joined with a weld joint to the bent pipe or branch (1), a welding burr (7) at the outer edge of the bent pipe or branch (1) substantially fills the space (6).

5. The combination as claimed in claim 4, wherein the space (6) tapers from the outer edge of the bent pipe or branch (1) towards the inner edge in such a way that at the inner edge of the bent pipe or branch (1) the welding burr (7) will be located in the inner corner formed by the end of the pipe (4) and the inner wall of the bent pipe or branch (1).

6. The combination as claimed in claim 1, wherein, in the inner corner of the combination, the maximum height of the step is less than 0.5 times the height of the step at the outer edge.

7. In a combination of a pipe and bent pipe or branch for joining to each other, the improvement of the bent pipe or branch comprising:

a body having an internal passage through the body between first and second end portions that are at an angle to each other; and first and second sleeves having first ends respectively on the first and second end portions of the body, opposite ends and straight internal passages respectively communicating with the internal passage through the body at the first and second end portions of the body, extending through the sleeves and opening at the opposite ends thereof for receiving ends of pipes to be joined at the angle;

wherein an internal diameter of the internal passage of the body at the first end portion is smaller than an internal diameter of the straight internal passage of the first sleeve so that a first step is provided to the internal passage of the body at the first end portion of the body, wherein the internal diameters are eccentric of each other so that a width of the first step on one side of the internal passage of the body at the first end portion of the body is 0.75 or less times the width of the first step on an opposite side of the internal passage of the body, the one side of the internal passage of the body at the first end portion is inside the angle, and a distance of an end of the pipe from a corner of the inside of the angle in the body in an axial direction of the pipe is less than three times a wall thickness of the pipe.

8. The bent pipe as claimed in claim 7, wherein the width of the first step on the one side of the internal passage of the body at the first end portion of the body is 0.5 or less times the width of the first step on the opposite side of the internal passage of the body at the first end portion of the body.

9. The bent pipe as claimed in claim 8, wherein the internal diameter of the first end portion of the body is in the plane of the angle.

10. The bent pipe as claimed in claim 9, and further comprising:
   a first pipe in the straight internal passage of the first sleeve, the first pipe having a first end at the first step and a first wall thickness at the first end,
   wherein the width of the first step at the opposite side of the internal passage of the body at the first end portion of the body is from 0.75 to 1.25 times the first wall thickness.

11. The bent pipe as claimed in claim 10, wherein the internal passage of the body from the first and second end portions of the body meet on the one sides of the internal passages of the body at the first and second end portions of the body at an inner corner of the body, and
   wherein a distance of the first end of the first pipe on the one side of the internal passage of the body at the first end portion of the body from the inner corner is from 0.5 to 3 times the first wall thickness.

12. The bent pipe as claimed in claim 11, wherein the first end of the first pipe and the first step provide a space therebetween for substantially filling with a welding burr of a weld of the first end of the first pipe to the first end of the first sleeve.

13. The bent pipe as claimed in claim 7, wherein the internal diameter of the first end portion of the body is in the plane of the angle.

14. The bent pipe as claimed in claim 13, and further comprising:
   a first pipe in the straight internal passage of the first sleeve, the first pipe having a first end at the first step and a first wall thickness at the first end,
   wherein the width of the first step at the opposite side of the internal passage of the body at the first end portion of the body is from 0.75 to 1.25 times the first wall thickness.

15. The bent pipe as claimed in claim 7,
   wherein an internal diameter of the internal passage of the body at the second end portion is smaller than an internal diameter of the straight passage of the second sleeve so that a second step is provided to the internal passage of the body at the second end portion of the body,
   wherein the internal diameters are eccentric of each other so that a width of the second step on one side of the internal passage of the body at the second end portion of the body is 0.75 or less times the width of the second step on an opposite side of the internal passage of the body, and
   the one side of the internal passage of the body at the second end portion of the body is inside the angle.

16. The bent pipe as claimed in claim 15, wherein the width of the second step on the one side of the internal passage of the body at the second end portion of the body is 0.5 or less times the width of the second step on the opposite side of the internal passage of the body at the second end portion of the body.

17. The bent pipe as claimed in claim 16, wherein the internal diameters of the second end portion of the body are in the plane of the angle.

18. The bent pipe as claimed in claim 7, and further comprising:
   a first pipe in the straight internal passage of the first sleeve, the first pipe having a first end at the first step and a first wall thickness at the first end,
   wherein the width of the first step at the opposite side of the internal passage of the body at the first end portion of the body is from 0.75 to 1.25 times the first wall thickness.

19. The bent pipe as claimed in claim 18,
   wherein the internal passage of the body from the first and second end portions of the body meet on the one sides of the internal passages of the body at the first and second end portions of the body at an inner corner of the body, and
   wherein a distance of the first end of the first pipe on the one side of the internal passage of the body at the first end portion of the body from the inner corner is from 0.5 to 3 times the first wall thickness.

20. The bent pipe as claimed in claim 19, wherein the first end of the first pipe and the first step provide a space therebetween for substantially filling with a welding burr of a weld of the first end of the first pipe to the first end of the first sleeve.

21. The bent pipe as claimed in claim 18, wherein the first end of the first pipe and the first step provide a space therebetween for substantially filling with a welding burr of a weld of the first end of the first pipe to the first end of the first sleeve.

* * * * *